Feb. 20, 1934.　　　　　E. PUGH　　　　　1,947,545
APPARATUS FOR TREATING MATERIALS
Filed Oct. 15, 1931　　2 Sheets-Sheet 1

INVENTOR
E. PUGH
BY
H. Q. Whitehorn
ATTORNEY

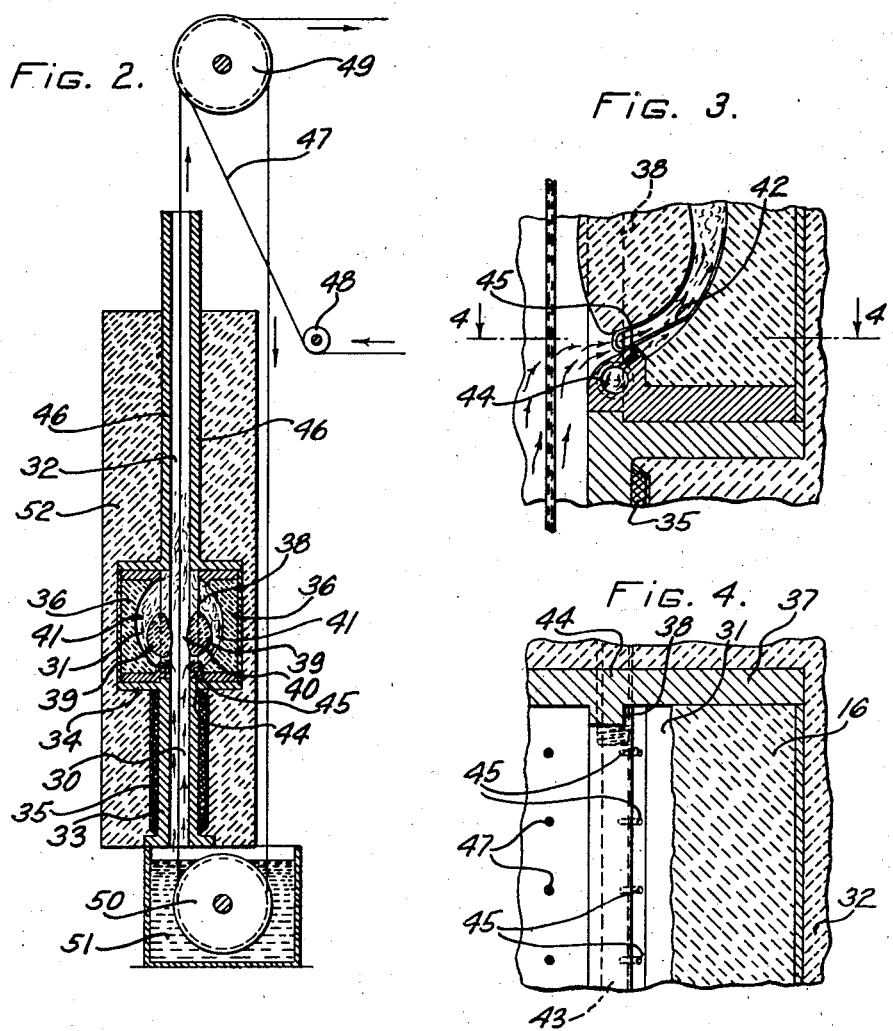

Patented Feb. 20, 1934

1,947,545

UNITED STATES PATENT OFFICE 1,947,545

APPARATUS FOR TREATING MATERIALS

Emerson Pugh, Downers Grove, Ill., assignor to Western Electric Company, Incorporated, New York, N. Y., a corporation of New York Application October 15, 1931. Serial No. 568,983

4 Claims. (Cl. 91—55)

This invention relates to a process of and apparatus for treating materials and more particularly to a process of and apparatus for treating material applied to a filiform core.

An object of the invention is to provide a simple, effective and inexpensive process and apparatus for baking a coat of enamel on wire, although the process and apparatus are adaptable to other coatings and other cores.

In one embodiment of the invention, a tubular baking chamber is provided having an annular combustion chamber surrounding it. The raw enamel coated wire is passed through the baking chamber. Combustible vapors driven off from the enamel solvent by the heat of the baking chamber are transferred through a connecting passage into the combustion chamber where they are burned to provide part or all of the heat for the baking chamber. At the same time cold air is drawn into the wire exit end of the baking chamber for the double purpose of cooling the coated wire and of being mixed with the solvent vapors to support combustion thereof.

In another embodiment of the invention a tubular baking oven is provided having in continuous sequence a heated tubular vaporizing chamber, then an expanded combustion chamber, and lastly an elongated tubular baking chamber. When a wire coated with raw enamel containing a volatile combustible ingredient is passed through the oven, the volatile ingredient is vaporized in the vaporizing chamber; the vapors evolved are drawn off and burned in the expanded combustion chamber out of contact with the wire and the hot gases from the combustion are utilized to bake the residual enamel on the wire as it passes through the baking chamber. Special means are provided to deflect the vapors from the path of the wire in the combustion chamber.

Further features and details of the invention will be apparent from the following detailed description and drawings, in which the Fig. 1 is a schematic, longitudinal, central section of an apparatus presenting one embodiment of the invention;

Fig. 2 is a schematic, longitudinal, central section of an apparatus presenting another embodiment of the invention;

Fig. 3 is an enlarged fragmentary view of part of the combustion chamber shown in Fig. 2, and Fig. 4 is a horizontal section on the line 4—4 of Fig. 3.

Figure 1:
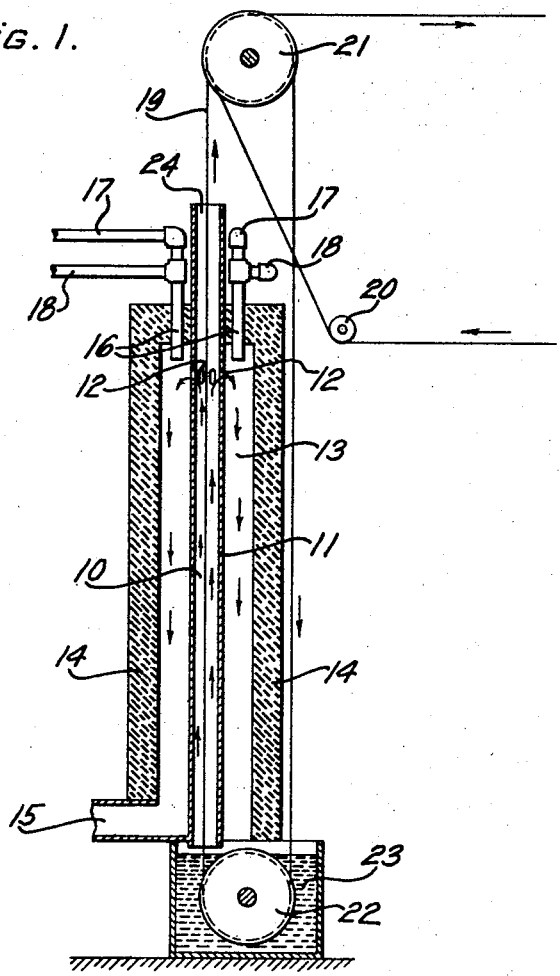

In carrying out the invention, as illustrated in Fig. 1, there is provided a tubular volatilizing and baking chamber 10, having walls 11 of suitable, sufficiently refractory material, as for instance, cast iron, aluminum bronze, baked clay, alundum, nichrome, or the like. The chamber 10 is provided in its upper portion with vapor vents 12—12 which open from the chamber 10 into a combustion chamber 13 of annular cross-section surrounding the baking chamber 10, bounded interiorly by the walls 11 and exteriorly by heat insulating walls 14—14 of any approved construction and material. From the bottom of the combustion chamber 13 an exhaust flue 15 leads and may be connected, if desired, to a stack, fan or other exhaust means which forms no part of the present invention and therefore is not shown. The top of the combustion chamber is entered by one or more burners 16, which, as here depicted, are gas burners having gas supply connections 17 and air supply connections 18, together with valves or other control devices of any approved kind whose nature is irrelevant to the invention and so is not particularly disclosed.

A wire 19 drawn from a supply (not shown) passes over a tensioning guide pulley 20, around a capstan 21, and under an idler pulley 22 more or less deeply immersed in a bath 23 of raw insulating material comprising non-combustible insulating ingredients dissolved, dispersed or suspended in a volatile, combustible liquid, such for example as petroleum ether, gasoline, amyl alcohol, wood alcohol, or the like. The wire 19, carried through the bath 23 by the pulley 22 picks up a coating of the raw insulation and is then drawn through the baking chamber 10 by being again passed around the capstan 21 from which the finished insulated wire passes out to a take-up device of any approved construction (not shown).

As the wire passes upward through the baking chamber 10, the volatile ingredients of the raw insulation are vaporized by the heat present in that portion of the chamber 10 below the vapor vents 12. The vapors thus formed are drawn outwardly through the vapor vents 12 by the injector effect of the burners 16 or by the exhaust means which draws from the flue 15 or by both. The vapors passing through the vents 12 may be mingled with air drawn down through the upper part 24 of the chamber 10 and are ignited by the burners 16. Thus the heat set free in the chamber 13 and transmitted through the walls 11 to the chamber 10 derives partly from the burners 16 and partly from the vapors of the insulation. Under favorable conditions, the process may derive all of its heat from the burning vapors, the gas supply 17 being shut off entirely after the apparatus is heated to working temperatures and the air supply 18 is adjusted to give proper combustion.

The hot, finished wire passing outwardly through the in-current cold air entering the upper part 24 of the chamber 10 is thoroughly cooled thereby before passing to the capstan 21 and so out.

It is, of course, clear that, if desirable, the pulley 22 and capstan 21 may be multiple so that the wire may pass through the apparatus several times before leaving and so receive several successive coats.

It will be seen from the above description that various characteristics of insulation upon the wire may be obtained by varying the conditions within the apparatus, e. g., the viscosity or density of the raw insulation, the temperature in the chamber 13, the speed of the wire through the chamber 10, etc.

In carrying out the invention as illustrated in Figs. 2 to 4, there is employed an oven having a continuous substantially tubular working space comprising in sequence a preliminary vaporizing chamber 30, an expanded combustion chamber 31, and a relatively contracted baking chamber 32.

The annular wall 33 of the vaporizing chamber 30 is composed of any appropriate heat resisting and heat transmitting material, such as cast iron, aluminum bronze, thin tile, alundum, or the like, and is formed at its upper end with a supporting flange 34. A heating device 35, here shown as an electric resistance heater, surrounds the vaporizing chamber to heat the same. In other embodiments other heating devices, e. g. gas burners, or conductive heating, might be used. The precise nature of this heating device being impertinent to the invention, it is unnecessary to disclose it in further detail.

The combustion chamber 31 is defined by the cylindrically curved inner faces of side wall blocks 36—36 and the flat inner faces of cross wall blocks 37 of any appropriate heat resisting material, such as "lavite", fire brick, asbestos cement or the like. The end walls 37 are formed with vertically directed shoulders 38. Substantially oval deflectors or baffles 39—39 extend across the chamber 31 parallel to the cylindrical side walls thereof and spaced from each other to provide a central passage 40 for wires undergoing treatment and spaced from the side walls 36—36 to provide vapor combustion passages 41—41. The deflectors 39 are formed at their ends with vertical shoulders corresponding to and abutting against the shoulders 38 and are held in position against said shoulders by appropriately formed U-shaped springs 42 of nichrome or other appropriate material. The deflectors 39 shield the wire from direct radiation of the heat of combustion and conductively convey heat to the wire. On account of the mass and thermal storage of heat of the baffles, sudden variations in the heat are smoothed out to provide a uniform temperature for baking the coating on the wire. Between the upper face of the flange 34 and the bottom of the wall blocks 36—36 and 37 is positioned a manifold 43 of material similar to that of the wall 33 and flange 34. The manifold 43 is provided with a supply cavity 44 and a plurality of jets 45—45 directed tangentially along the cylindrical curvature of the vapor combustion passages 41—41. The manifold is fed through the cavity 44 with compressed air or with a mixture of compressed fuel gas and air as may be requisite from a source not shown. The lower end of the combustion chamber 31 opens directly from and is substantially a continuation of the vaporizing chamber 30.

The upper end of the combustion chamber 31 opens directly into and is substantially a continuation of the baking chamber 32. The chamber 32 is a simple tubular passage leading up from the chamber 31 and delimited by walls 46—46 which may be similar in material and structure to the walls 33 of the chamber 30. The whole combination of chambers may be enclosed in a common sheath 52 of appropriate heat insulating material, such as asbestos cement, fire brick, mineral wool, sil-o-cel, or the like.

In operation a wire 47, fed from a source of supply not shown, passes over a tension roller 48, thence over an idler sheave 49, down under an idler sheave 50 immersed in a bath 51 of raw enamel, up through the consecutive chambers 30, 31 and 32 of the oven and over a second idler sheave 49 to a take-up device not shown.

The enamel bath 51 contains a volatile combustible ingredient, such as gasoline, alcohol, acetone, or the like. As the wire, coated with raw enamel, passes through the heated vaporizing chamber 30, the volatile ingredient of the enamel is vaporized. The vapors thus evolved are drawn by the inspirator effect of the jets 45 away from the wire and are burned in the passages 41—41 out of contact with the wire.

When the shields or deflectors 39—39 and the wall blocks 37 attain a certain temperature, the flame disappears and the combustion of the vapors continues by a process which appears to be a sort of volume combustion, and resembles a flameless glowing. The best results are obtained when the flame completely disappears although very good results may be had with a small flame present.

The hot combustion products rejoin the wire as they enter the lower end of the baking chamber 32 and complete the baking of the residual enamel on the wire as it passes through the baking chamber.

The wire 47 instead of passing directly from the second sheave 49 to a take-up device may pass down to a second sheave 50 in the bath 51 and up through the oven to a third sheave 49. This may be repeated as many times as necessary to give the wire any desired number of coatings.

The amount of air or of mixed fuel gas and air fed through the manifold 43 may be so regulated by the supply that combustion of the vapors in the chamber 31 is substantially complete and the gaseous products discharged from the top of chamber 32 are inoffensive and harmless.

The indirect baking of the enamel produces a more uniformly baked coating than direct flame baking. Small variations in the amount of fuel carried up by the wire, due to particles of grease, copper, slivers or the like does not produce corresponding variations in the baking since the wire is shielded from the direct flame. The shielding of the wire from the direct flame also prevents deposits of condensed gums, soot, and carbonized materials on the enamel coating.

It is, of course, to be understood that the embodiments of the invention herein described are illustrative only and that various changes in the shape and proportions of the parts may be made without departing from the scope of the invention as defined in the appended claims.

What is claimed is:

1. In an apparatus for treating cores, means to deposit a composition containing a volatile combustible ingredient upon a core, means to vaporize the volatile ingredient, a combustion chamber comprising a passage to receive a core and a separate combustion passage diverging therefrom and returning thereto, and means to draw off the vaporized ingredient from the core into the combustion passage.

2. In an apparatus for treating cores, means to deposit a composition containing a volatile combustible ingredient upon a core, means to vaporize the volatile ingredient, a combustion chamber comprising a passage to receive a core and a separate combustion passage, and means to draw off the vaporized ingredient from the the core into the combustion passage including an inspirator positioned in the combustion passage.

3. In an apparatus for treating cores, the combination with means to deposit a composition containing a volatile combustible ingredient upon a core, of an oven through which the core is passed comprising in continuous sequence a volatilizing chamber, a combustion chamber having a core passage and a combustion passage separate therefrom, and a baking chamber.

4. In an apparatus for treating cores, the combination with means to deposit a composition containing a volatile combustible ingredient upon a core, of an oven through which the core is passed comprising in continuous sequence a volatilizing chamber, a combustion chamber having a core passage and a combustion passage diverging therefrom and returning thereto, and a baking chamber.

EMERSON PUGH.